Dec. 20, 1960 R. T. BAYARD ET AL 2,965,780
PROPORTIONAL COUNTER
Filed Aug. 12, 1954

WITNESSES:
E.A. McCloskey
Leon J. Vaza

INVENTORS
Robert T. Bayard
and Allen G. McElroy.
BY
Hymen Diamond
ATTORNEY

United States Patent Office 2,965,780
Patented Dec. 20, 1960

2,965,780

PROPORTIONAL COUNTER

Robert T. Bayard and Allen G. McElroy, Pittsburgh, Pa., assignors to Westinghouse Electric Corporation, East Pittsburgh, Pa., a corporation of Pennsylvania Filed Aug. 12, 1954, Ser. No. 449,354

11 Claims. (Cl. 313—61)

Our invention relates to radiation detectors and has particular relation to so-called neutron flux counters which determine the density of the neutron flow in a predetermined region.

A neutron flux counter in accordance with the teachings of the prior art of which we are aware, is disclosed in copending application Serial No. 434,051, filed June 2, 1954, to Robert T. Bayard, now U.S. Patent No. 2,879,423 (hereinafter called the Bayard application). This counter has proved highly useful in certain situations for the measurement of neutron flux. But because of its relatively large dimension (a half inch to 2 inches in diameter and 6 inches to 24 inches in length), it is not applicable to situations in which the neutron flux existing locally in a restricted region is to be measured or where it is desired to measure neutron activity at essentially a given geometric point in space. Thus, it is often desirable to measure the local neutron flux existing in narrow spaces having, for example, a width of 1½ inches and a thickness of about ⅛ inch. The counter disclosed in the Bayard application cannot serve for this purpose.

In measuring the flux existing locally in a region where the Bayard counter cannot be applied, the practice has been to irradiate foil of a material such as indium and to measure the activity of the foil with a counter, such as a Geiger counter, after it has been so irradiated and removed from the active region. A disadvantage of this procedure arises from the difficulty of handling the foil. The foil must be quickly removed from the locality where it is irradiated to the locality where the counter is present. Because the foil is radioactive, the operator in moving this foil is subjected to danger of injury. Because of the necessity of moving the foil and the danger involved in its movement, the measurement afforded by the foil method is not as accurate and as readily available as is desired. In addition, the operation of the active apparatus must usually be interrupted to insert and remove the foil. Such interruption is considerable, not only from an operational standpoint but also because it affects the accuracy of the measurement.

It is accordingly broadly an object of our invention to provide facilities for measuring the local neutron flux existing in a small region directly without the aid of any component, such as indium foil, whch must be inserted and removed for measurement.

A more specific object of our invention is to provide a neutron flux counter capable of measuring the local neutron flux existing in a restricted region.

Another specific object of our invention is to provide a neutron flux counter of such small dimensions that, to a reasonable approximation, it may be assumed when the counter is responding to neutron flux that it is measuring the flux at a geometric point in situations in which the neutron flux varies sharply from point to point.

An incidental object of our invention is to provide a neutron flux counter, which shall produce minimum of distortion in the neutron flux field when inserted for measurement purposes.

An ancillary object of our invention is to provide a rugged vacuum seal particularly suitable for neutron flux counters which shall be capable of withstanding a high potential of the order of 3,000 volts without producing appreciable voltage noise pulses.

A further ancillary object of our invention is to provide a novel coaxial cable for use with neutron flux counters which shall have a very low characteristic capacity.

In accordance with our invention, we provide a neutron flux counter which consists of a thin frame of conducting material covered on each face by a thin sheath of conducting material. The frame and sheath together constitute the wall of a gas-tight enclosure and constitutes the "ground" electrode or cathode of the counter. The frame is provided with a pair of oppositely disposed holes or openings of small diameter. Through one of these openings, the exhaust tube for the enclosure is sealed. Through the other an insulating bead carrying a conducting wire is sealed. The conducting wire and bead support the "hot" electrode or anode within the frame. Preferably, the hot electrode is in the form of a grid wound on a second frame. Since the opening through which the bead is sealed is directly opposite to the opening in which the exhaust tube is sealed, the exhaust tube serves to align the bead while it is being sealed.

The coaxial cable in accordance with our invention consists of a flattened plastic tube within which a wire of very small diameter is centrally disposed. The flattened plastic tube is enclosed in a sheath consisting of plates or strips of shim stock extending along the opposite faces of the tube and welded or soldered together.

In accordance with the preferred practice of our invention, the central wire in the bead of the counter is connected to the wire in the coaxial cable, and the sheaths of the coaxial cable and the counter are integral. The counter-coaxial cable combination is in the form of a thin strip having cross-sectional dimensions of the order of 1 inch by $\tfrac{3}{32}$ inch. This strip may be inserted with facility in a space about 1½ inches wide by ⅛ inch thick, and thus lends itself to direct measurement of flux in small spaces.

The novel features that we consider characteristic of our invention are disclosed generally above. The invention itself, both as to its organization and its method of operation, together with additional objects and advantages thereof will be understood from the following description of a specific embodiment in connection with the accompanying drawing, in which.

Figure 1:
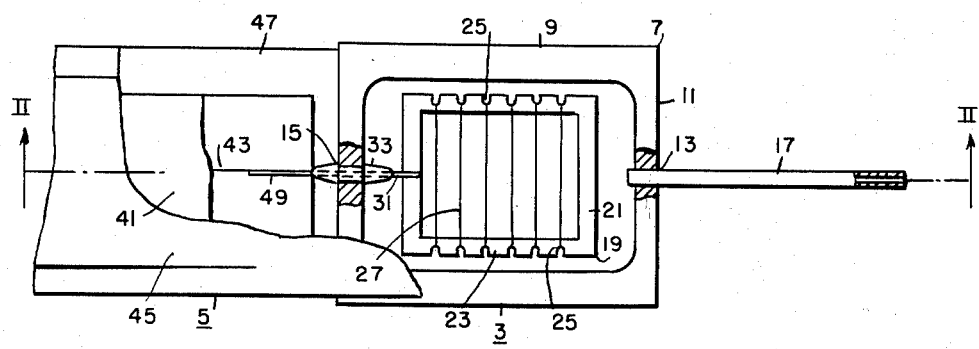
Figure 1 is a view in elevation of a preferred embodiment of our invention.
Figure 2:
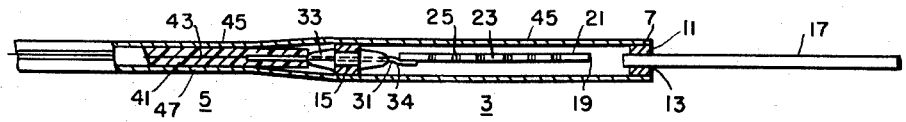
Fig. 2 is a view in section, taken along line II—II of Fig. 1.

The apparatus shown in the drawing comprises a counter 3 and a coaxial cable 5 combined to form a single integral unit. The counter 3 includes an outer frame 7 which may be of one-piece construction and is preferably composed of an alloy, such as a cobalt iron and nickel alloy, which seals readily to glass, such as a borosilicate glass, and is known in the art under the trademark, Kovar. In this example, the frame is conveniently of rectangular form, with its sides 9 and 11 having outside dimensions of about 1¼ inches by 1⅛ inches, a width of about ⅛ inch and a thickness of about 1/16 of an inch. Internally, the frame may be filleted, as shown.

The frame has central openings or holes of small bore 13 and 15 in its shorter sides.

Conveniently, these openings may have a diameter of about .035 to .045 inch. An exhaust tube 17 which, in this arrangement, also is composed of Kovar alloy, copper, brass, or other suitable material, is sealed into one of the openings 13 by brazing or welding.

The frame 7 constitutes the support for the wall of the enclosure of the counter and at the same time is the grounded electrode or cathode of the counter. The hot electrode or anode of the counter comprises a second frame 19 of substantially smaller dimensions than the first frame. Conveniently, this second frame is composed of Kovar alloy and, in one form, is about 5/8 of an inch square, having sides 21 and 23 1/16 inch wide and a thickness of .010 inch. The sides 23 have oppositely disposed notches 25. The frame 19 carries a wire grid 27 of very thin wire which may conveniently be composed of tungsten wire about .0005 inch in diameter. The wire 27 is engaged in the notches in the frame 19. Its length extends from one notch 25 to the opposite notch 25 across one face of the sides 23 of the frame and from one notch 25 to the adjacent notch 25 along the other face of the sides 23 of the frame. The wire 27 is secured to the anode frame by spot welding.

The anode frame 19 and its wire grid 27 are supported from a wire 31 sealed centrally into a bead 33, the assembly of wire 31 and bead 33 then being sealed through the opening 15 in the frame 7. It is important that the grid wires 27 of the frame 19 should be centrally located along the thickness dimensions of frame 7. Since bead 33 is also centrally located along the thickness dimension of frame 7, it is necessary that wire 31 be bent as shown at 34 before being welded to the anode frame. This wire 31 can also be composed of Kovar alloy and conveniently can have a diameter of .020 inch. The bead 33 through which the wire is sealed, in this example has an inside diameter of .022 inch and an outside diameter of .020 inch and a length of about 3/8 inch. The wire 31 and bead 33 sealed through the opening 15 are adequate to support the frame.

The coaxial cable 5 includes an insulating member 41 which in one arrangement is formed by flattening a tube of plastic material, such as polyethylene. Through the center of this insulating member a tungsten wire 43 conveniently having a diameter of about .001 inch extends. This wire is composed of tungsten and is connected to the Kovar alloy wire 31 extending from the lead by welding, soldering or brazing. The frame 7 of the counter 3 and the flattened insulating member 41 are enclosed together in a sheath consisting of thin strips 45 and 47, desirably of brass, of the type which ordinarily serves for shim stock. The strips 45 and 47 are soldered together at the edges to form the conducting sheath for the cable and are soldered along the faces of the four sides 9 and 11 of the wall frame of the counter.

While, as shown herein, the counter and cable combinations are assembled as a unit, separate counters may also be provided. In this case, separate strips of brass of about .005 inch thickness are soldered to the opposite faces of the frame 7.

In making the counter, the exhaust tube 17 is first soldered or brazed into the hole 13 in the wall frame 7. The bead is then prepared from a piece of borosilicate glass tubing of outside diameter of about .030 inch, inside diameter of about .022 inch and having a length of about 3/8 inch. This tube is slipped over a piece of Kovar alloy wire 31 somewhat longer than the longest dimension 9 of the frame 7. The wire 31 is then flame sealed within the glass tubing a short distance from one of its ends 49, leaving sufficient wire extending from the bead to the other end to enable the wire 31 to be centered in the exhaust tube 17. The bead 33 thus formed is then inserted into the hole in the frame in such manner that the end 49 of the wire extends outside of the frame 7 and the other end of the wire engages the exhaust tube 17, and the bead 33 is thus centered in the hole. The frame 7 and bead 33 thus assembled are rotated in a fixture while a flame is directed to the region of the frame 7 where the bead is inserted. The bead 33 is thus sealed into the frame 7.

After the bead has thus been sealed into the frame, the wire 31 sealed through the bead 33 is cut off to the proper length and spot welded to the anode frame 19. Thereafter, the grid wire 27 is wound on the anode frame and secured at its ends by spot welding.

The wire extending outside of the frame from the bead is then welded to the center wire 43 of the coaxial cable 5 and the counter and cable are enclosed within the aforesaid strips 45 and 47 having a thickness of the order of .005 inch.

In producing the combination, it is to be kept in mind that the soldering or brazing of the sheath 45—47 to the frame 7 of the counter 3 should be performed along all four sides 9 and 11 of the frame so that the region within the frame is vacuum-tight. After this region has been enclosed vacuum-tight, the air is exhausted from it through the exhaust tube 17 and the assembly is subjected to the usual vacuum treatment. Thereafter, the sealed opening within the frame 7 is filled with boron trifluoride to a pressure of approximately one atmosphere and the exhaust tube is sealed off. The assembly is now ready for use. In use, the assembly is located at the point in space where the neutron flux is to be measured, with the end of the coaxial cable extending outside. The wire 43 of the cable 5 and its sheath 45—47 are connected to an amplifier and indicator of the proper type. The neutrons in the space pass into the atmosphere of boron trifluoride producing energetic alpha particles (helium nucei) and lithium nuclei which results in ionization of the gas. The ionization may be measured with an amplifier.

Our work with the assembly as just described and also with separate counters 3 as described has revealed that the structure as just described has numerous advantages. The counter is rugged. We have found that when one of the counters was dropped on a wooden floor from a height of four feet, the seal remained intact and the counter suffered no damage whatsoever. The counter also has highly desirable electrical properties. A potential of 2500 to 3000 volts may be impressed between the anode 19 and the wall 7 of the container not only without producing arc-over, but even without producing appreciable voltage noise pulses. The coaxial cable has a very low characteristic capacity of the order of 10 micro-microfarads per foot. Because of this low capacity, the counter may operate at a very low voltage, of the order of 1200 or 1400 volts without appreciable loss in transmitting a signal.

The counter 3 has important advantages in use. It provides facilities for measuring the flux in restricted regions directly and continuously rather than indirectly and intermittently, as does the indium foil technique. By using the counter, the changes in flux with respect to both time and position in a region in which neutrons are being produced may be readily determined. The measurement of flux may be made continuously without the necessity to insert and remove a detector as is the situation in the use of indium detectors. In fact, it is possible to move the counter from point to point in a neutron flux field and thus to accurately measure the point-by-point neutron flux condition.

While we have shown and described certain specific embodiments of our invention, many modifications thereof are possible. Thus, while in the preferred practice of our invention the frame 19 is supported only at one end by the bead 33, it could be supported at both ends, the other support being provided in connection with the exhaust tube 17 as in a tipless bulb, or the frame 19 could be supported from the bead 33 at one end and from beads symmetrically disposed with reference to the tube 17. Our invention then is not to be restricted except insofar as is necessitated by the spirit of the prior art.

We claim as our invention:

1. A counter combination for neutron flux comprising, a gas-tight container having therein a gas responsive to neutrons, an electrode in said container, a coaxial cable including an insulating member having a conducting wire therein, and having a conducting covering, said container being in the form of a thin flat strip having top and bottom walls, the top and bottom walls of the container and of the conducting covering of the coaxial cable comprising oppositely disposed conducting strips secured together at their opposite edges throughout the length of said cable to form a sheath.

2. A radiation detector comprising, an open frame member, an electrode mounted in said frame and insulated therefrom, a coaxial cable including a relatively flat insulating member, a conducting wire sealed therein, said insulating member having a thickness no greater than said open frame, and a conducting sheath composed of opposing elongated strips of conducting material secured together at their lateral edges and enclosing said insulating member, said wire being connected to said electrode, said strips being extended to cover opposite sides of said frame member to enclose a volume therein, and said volume being filled with an ionizing gas.

3. A radiation detector comprising, an open frame member having a thin flat strip with an opening therethrough, an electrode including a thin support having a wire grid wound thereon and mounted in said frame in insulated relation therewith, a coaxial cable including a relatively flat insulating member, a conducting wire sealed therein, said insulating member having a thickness no greater than said open frame, and a conducting sheath composed of opposing elongated strips of conducting material secured together at their lateral edges and enclosing said insulating member, said wire being connected to said electrode, said strips being extended to cover opposite sides of said frame member to enclose a volume therein, and said volume being filled with an ionizing gas.

4. A radiation detector comprising an open frame member including a relatively thin flat strip with an opening therethrough, an electrode disposed within said frame member, a sheet of conductive material covering each open side of said frame, means for connecting said electrode and said covered frame to a source of electric potential, said means including a conductive member secured to said electrode and extending through said strip opening, and an insulating member inserted in said opening and spacing said conductive member from the walls of said opening, said conductor and said electrode being supported in spaced relation to said frame member solely by said insulating member.

5. A radiation detector comprising an open frame member including a relatively thin flat strip with an opening therethrough, an electrode disposed within said frame member, a sheet of conductive material covering each open side of said frame, means for connecting said electrode and said covered frame to a source of electric potential, said means including a conductive member secured to said electrode and extending through said strip opening, an insulating member inserted in said opening and spacing said conductive member from the walls of said opening, said conductor and said electrode being supported in spaced relation to said frame member solely by said insulating member, said frame member including a second relatively thin flat strip with an opening therethrough, said second opening being in substantial alignment with said first-mentioned opening, and an exhaust tubulation secured to said frame member in communication with said second-mentioned opening, at least that portion of said tubulation adjacent said frame member likewise being in substantial alignment with said first opening.

6. An electric cable comprising an elongated flat insulating member, an electric conductor disposed within said member and extending longitudinally therethrough, and a conductive sheath covering said insulating member, said sheath including a pair of opposed electrically conductive strips secured together at their lateral edges, respectively, each of said strips extending substantially along the entire length of said insulating member, said strips in addition each extending beyond said insulating member and being separable when so extended for connection to a current utilizing device of similar configuration.

7. A radiation detector comprising an open frame member, an electrode mounted in said frame member in insulated relation therewith, and an electric cable including an insulating member, a conductor disposed within said member, a conductive sheath enclosing said insulating member, said conductor being connected to said electrode, and component parts of said sheath being extended to cover the open sides of said frame member and to enclose a volume therewithin.

8. A radiation detector comprising an open frame member, an electrode mounted in said frame member in insulated relation therewith, and an electric cable including an insulating member, a conductor disposed within said member, said insulating member having a thickness at most substantially equal to that of said frame member, a conductive sheath enclosing said insulating member, said conductor being connected to said electrode, and component parts of said sheath being extended to cover the open sides of said frame member and to enclose a volume therewithin.

9. A radiation detector comprising an open frame member, an electrode mounted within said frame member in insulated relation therewith, and circuit means for supplying potential to said frame member and said electrode, said circuit means including a conductor secured to said electrode and another conductor terminating in a pair of relatively flat members which are secured individually to said frame member in a manner to cover the open sides thereof.

10. A radiation detector comprising an open frame member, an electrode mounted within said frame member, an electrical conductor secured to said electrode for connecting said electrode to a source of electric potential, said conductor passing through an opening formed in said frame member, a rigid insulating member inserted through said opening and enclosing a portion of said conductor, said insulating member extending along at least a portion of the distance between said opening and said electrode to support both said conductor and said electrode relative to said frame member, and means for covering each open side of said frame member and for coupling said frame member to a source of potential.

11. A radiation detector comprising an open frame member, an electrode positioned within said frame member and insulated therefrom, and circuit means for coupling said detector to a source of potential, said circiut means including a first conductor having relatively flat components covering the opposing open sides of said frame member, and a second conductor insulated from said frame member and secured to said electrode to support the same.

References Cited in the file of this patent

UNITED STATES PATENTS

| | | |
|---|---|---|
| 2,200,776 | Hoover | May 14, 1940 |
| 2,372,323 | Gordon | Mar. 27, 1945 |
| 2,462,471 | Crumrine | Feb. 22, 1949 |
| 2,498,461 | Skellett | Feb. 21, 1950 |
| 2,519,007 | Wilson | Aug. 15, 1950 |
| 2,532,956 | Simpson | Dec. 5, 1950 |
| 2,604,598 | Mead et al. | July 22, 1952 |
| 2,666,865 | Borkowski | Jan. 19, 1954 |
| 2,793,309 | Simpson | May 21, 1957 |